H. A. CARLTON.
Check-Hooks for Harness.

No. 138,003.          Patented April 22, 1873.

Witnesses
S. N. Piper
L. N. Möller

Hiram A. Carlton
by his attorney
R. H. Eddy

UNITED STATES PATENT OFFICE.

HIRAM A. CARLTON, OF CHELSEA, MASSACHUSETTS.

IMPROVEMENT IN CHECK-HOOKS FOR HARNESS.

Specification forming part of Letters Patent No. 138,003, dated April 22, 1873; application filed August 14, 1872.

*To all whom it may concern:*

Be it known that I, HIRAM A. CARLTON, of Chelsea, of the county of Suffolk and State of Massachusetts, have invented a new and useful or Improved Harness Check-Rein Hook; and do hereby declare the same to be fully described in the following specification and represented in the accompanying drawing, of which—

Figure 1:
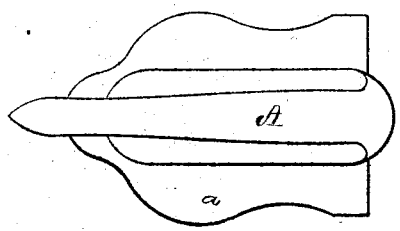
Figure 2:
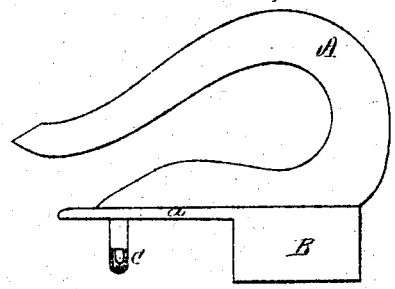
Figure 3:
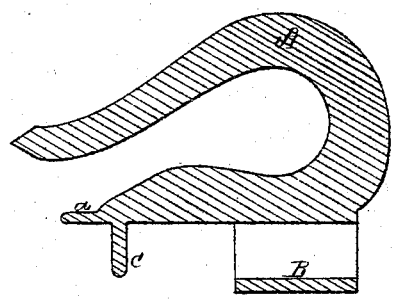
Figure 3:
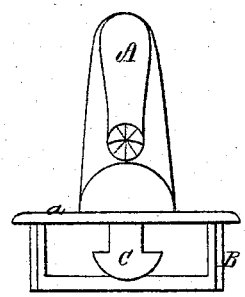
Figure 4:
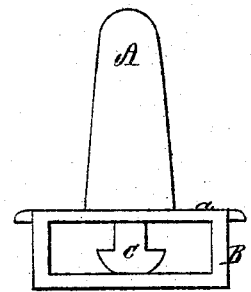

Figure 1 is a top view, Fig. 2 a side elevation, Fig. 3 a longitudinal section, Fig. 4 a front-end view, and Fig. 5 a rear-end view of it.

In the said drawing, A denotes a hook, erected on a base-plate, a, provided with a slide or box-loop, B, arranged to extend below and from the said base, and formed and open at opposite ends, all as shown. A dovetailed or T stud, C, is also extended down from the base-plate in rear of the part B, and formed as represented.

The article when in use has the back-strap of the harness run through the box-slide, the stud C being inserted in a hole made in the back-strap. The stud and the part B operate to hold the hook to the strap, and against the draft of the check-rein when hitched upon the hook.

The article is particularly designed for double harness, such as have no saddles, it being intended to answer the purposes of what is usually termed the "water-hook" of a harness.

I make no claim to either construction or mode of application of a check-rein hook as described or represented in the United States Patent, No. 74,391, to Thomas J. Magunder, my hook, though somewhat analogous to varying materially from either of such patent hooks, neither of which has a holding or buttoning stud like, and to operate like, that of my hook; nor has it a slide arranged and for use with such a stud as in my hook. The stud of my hook enters a hole in the leather strap which goes through the slide, the stud acting as a button to hold the hook in place and prevent it from rising off the strap; therefore,

I claim as my invention—

The said harness check-hook, made substantially as described, viz., of the hook, the slide, and the holding stud or button, arranged and combined essentially as set forth.

HIRAM A. CARLTON.

Witnesses:
R. H. EDDY,
S. N. PIPER.